(12) United States Patent
Suzuki

(10) Patent No.: US 6,317,045 B1
(45) Date of Patent: Nov. 13, 2001

(54) REPRODUCING DEVICE

(75) Inventor: Shuuichi Suzuki, Nihonmatsu (JP)

(73) Assignee: Nippon Columbia Co., Ltd., Tokyo (JP)

( * ) Notice: Subject to any disclaimer, the term of this patent is extended or adjusted under 35 U.S.C. 154(b) by 0 days.

(21) Appl. No.: 09/340,679

(22) Filed: Jun. 29, 1999

(30) Foreign Application Priority Data

Jul. 3, 1998 (JP) .................................................. 10-204442

(51) Int. Cl.$^7$ .................................................. G08B 13/14
(52) U.S. Cl. ...................... 340/571; 340/540; 340/568.1; 340/384.1; 340/384.5; 340/286.01; 340/10.5; 340/10.52; 340/825.72; 340/572.1
(58) Field of Search ................................ 340/571, 572.1, 340/540, 568.1, 384.1, 825.06, 825.15, 825.17, 825.25, 825.3, 825.31, 825.32, 825.36, 825.44, 10.5, 10.52, 825.72, 286.01, 286.02, 286.11, 286.12, 384.5, 384.72

(56) References Cited

U.S. PATENT DOCUMENTS

| | | | |
|---|---|---|---|
| 3,760,349 | * | 9/1973 | Keister et al. .................. 340/901 |
| 3,934,202 | * | 1/1976 | Missale .................. 325/54 |
| 4,104,731 | * | 8/1978 | Grudowski et al. .................. 340/172.5 |
| 4,163,123 | * | 7/1979 | Brodsky et al. .................. 179/15 AL |
| 4,355,385 | * | 10/1982 | Hampshire et al. .................. 370/85 |
| 4,404,611 | * | 9/1983 | Demenus .................. 360/137 |
| 5,020,155 | * | 5/1991 | Griffin et al. .................. 455/617 |
| 5,161,250 | * | 11/1992 | Ianna et al. .................. 455/66 |
| 5,404,129 | * | 4/1995 | Novak et al. .................. 340/428 |

FOREIGN PATENT DOCUMENTS

| | | | |
|---|---|---|---|
| 406103022-A | * | 4/1994 | (JP) . |
| 407274300-A | * | 10/1995 | (JP) . |
| 08185584 | | 7/1996 | (JP) . |
| 08263006 | | 11/1996 | (JP) . |
| 11-68645 | * | 3/1999 | (JP) . |
| 2000122680-A | * | 4/2000 | (JP) . |

* cited by examiner

Primary Examiner—Nina Tong
(74) Attorney, Agent, or Firm—Dickstein Shapiro Morin & Oshinsky LLP

(57) ABSTRACT

The reproducing device is prevented from being taken out because the reproducing device becomes controllable by operation of the device only when a visitor who borrowed the reproducing device enters through a specified entrance and that the reproducing device becomes uncontrollable by operation of the device when the visitor has come out of the exit. When a receiving means of the reproducing device receives an ID code signal for enabling control by a command from an operation means of the device, the reproducing device becomes controllable by a command from the operation means. When the receiving means receives another ID code signal for disabling control by a command from the operation means, control by a command from the operation means is disabled and a reproducing means of the reproducing device outputs voice information requesting a return of the device.

5 Claims, 3 Drawing Sheets

REPRODUCING DEVICE

FIELD OF THE INVENTION

The present invention relates to a voice guide reproducing device equipped with a theft-preventive function, which is lent out to visitors in art galleries, event halls or the like.

DESCRIPTION OF RELATED ART

In event halls, art galleries or the like, reproducing devices as a voice guide are sometimes rented to visitors to give them various kinds of information. To prevent the reproducing device from being taken away unlawfully, the event promoters attach a theft-preventive means to the reproducing devices as a voice guide so that the theft-preventive means is detected by a detection device installed near an exit. When the detection device detects a theft-preventive means, the alarm goes off.

FIG. 5 is a schematic diagram showing an example of a conventional theft-preventive device.

In FIG. 5, when a visitor 1 carrying a reproducing device 24 equipped with a magnetic card 23 as a theft-preventive means passes near a detection device 25, the detection device 25 detects magnetism of the magnetic card 23, and an alarm device 26 sounds off a warning.

SUMMARY OF THE INVENTION

With a theft-prevention device as mentioned above, a detection device 25 needs to be installed near the exit and a place must be secured for installation of the detection device. A problem with such a detection device is that if the visitor 1 notices that the detection device 25 is installed, the visitor 1 may be offended.

Further, regardless of whether a visitor 1 carrying a reproducing device 24 unwittingly goes to a place where the detection device 25 is to be actuated or the visitor 1 takes out a reproducing device 24 intentionally, the same warning sound is produced. Therefore, when a visitor 1 while holding a reproducing device 24 mistakenly goes near the detection device 25, the visitor 1 may be offended.

The present invention has been made with the above problems taken into consideration. An object of the present invention is to make a reproducing device operable only when a visitor who borrowed the reproducing device goes through a specified entrance. When the visitor goes out of an exit, the reproducing device is disabled and the reproducing device becomes unusable, thereby preventing the reproducing device from being taken out unlawfully.

Another object of the present invention is to reproduce voice information to guide a visitor who borrowed a reproducing device to a specified entrance if the visitor did not enter through the specified entrance.

Yet another object of the present invention is to reproduce voice information requesting a return of the borrowed reproducing device or make a warning alarm when the visitor who borrowed it comes out of the exit and goes away from the area where the visitor should return the reproducing device so as to prevent the reproducing device from being taken away unlawfully.

To solve the above problems, according to a first aspect of the present invention, there is provided a reproducing device comprising: a receiving means for receiving an ID code signal; an ID analyzing means for analyzing the received ID code signal; a memory means for storing voice information associated with the ID code signal; a reproducing means for reproducing voice information stored in the memory means; a control means for controlling the receiving means, ID analyzing means, memory means and reproducing means; and an operation means for giving a command to the control means, wherein further comprising an operation enabling means for enabling the operation means to input the command to the control means when the receiving means receives an ID code signal for enabling control based on the command from the operation means.

According to a second aspect of the present invention, there is provided a reproducing device comprising: a receiving means for receiving an ID code signal; an ID analyzing means for analyzing the received ID code signal; a memory means for storing voice information associated with the ID code signal; a reproducing means for reproducing voice information stored in the memory means; a control means for controlling the receiving means, ID analyzing means, memory means and reproducing means; and an operation means for giving a command to the control means, wherein further comprising an operation disabling means for disabling the operation means from inputting the command to the control means when the receiving means receives an ID code signal for disabling control based on the command from the operation means.

According to a third aspect of the present invention, there is provided a reproducing device comprising: a receiving means for receiving an ID code signal; an ID analyzing means for analyzing the received ID code signal; a memory means for storing voice information associated with the ID code signal; a reproducing means for reproducing voice information stored in the memory means; a control means for controlling the receiving means, ID analyzing means, memory means and reproducing means; and an operation means for giving a command to the control means, wherein when the receiving means first receives an ID code signal for disabling control based on the command from the operation means or when the receiving means receives an ID code signal for disabling control based on the command from the operation means even after the receiving means already received an ID code signal for enabling control based on the command from the operation means although the command from the operation means has not been given to the control means, the control means controls the reproducing means so as to read voice information for leading the visitor to a specified entrance and reproduce the voice information regardless of the use condition of the reproducing device.

According to a fourth aspect of the present invention, there is provided a reproducing device comprising: a receiving means for receiving an ID code signal; an ID analyzing means for analyzing the received ID code signal; a memory means for storing voice information associated with the ID code signal; a reproducing means for reproducing voice information stored in the memory means; a control means for controlling the receiving means, ID analyzing means, memory means and reproducing means; and an operation means for giving a command to the control means, wherein when the receiving means first receives an ID code signal for preventing a theft of the reproducing device, the control means controls the reproducing means so as to read voice information for leading the visitor to a specified entrance from the memory means and reproduce the voice information.

According to a fifth aspect of the present invention, there is provided a reproducing device comprising: a receiving means for receiving an ID code signal; an ID analyzing means for analyzing the received ID code signal; a memory means for storing voice information associated with the ID code signal; a reproducing means for reproducing voice information stored in the memory means; a control means for controlling the receiving means, ID analyzing means, memory means and reproducing means; and an operation means for giving a command to the control means, wherein when the receiving means receives an ID code signal for enabling control based on the command from the operation means and then the operation means gives the command to the control means and subsequently the receiving means receives an ID code signal for disabling control based on the command from the operation means, the control means disables control based on the command from the operation means and controls the reproducing means so as to reproduce voice information requesting the visitor to return the reproducing device.

According to a sixth aspect of the present invention, there is provided a reproducing device comprising: a receiving means for receiving an ID code signal; an ID analyzer for analyzing the received ID code signal; a memory means for storing voice information associated with the ID code signal; a reproducing means for reproducing voice information stored in the memory means; a control means for controlling the receiving means, ID analyzing means, memory means and reproducing means; and an operation means for giving a command to the control means, wherein when the receiving means receives an ID code signal for enabling control based on the command from the operation means and then the operation means gives the command to the control means and subsequently the receiving means receives an ID code signal for disabling control based on the command from the operation means and finally the receiving means receives an ID code signal for preventing a theft of the reproducing device, the control means controls the memory means and the reproducing means so that voice information requesting a return of the reproducing device is output.

According to a seventh aspect of the present invention, there is provided a reproducing device comprising: a receiving means for receiving an ID code signal; an ID analyzing means for analyzing the received ID code signal; memory means for storing voice information associated with the ID code signal; a reproducing means for reproducing voice information stored in the memory means; a control means for controlling the receiving means, ID analyzing means, memory means and reproducing means; an operation means for giving a command to the control means; and an alarm means, wherein when the receiving means receives an ID code signal for enabling control based on the command from the operation means and then the operation means gives the command to the control means and subsequently the receiving means receives an ID code signal for disabling control based on the command from the operation means and finally the receiving means receives an ID code signal for preventing a theft of the reproducing device, the control means controls the alarm means so as to emit a warning alarm.

According to the present invention, it is not required to mount a special-purpose theft-preventive means on the reproducing device or install a detecting device at an exit of the hall.

The visitor is unable to operate the reproducing device outside the hall to which its use is limited. Therefore, the theft of the reproducing device can be prevented.

If a visitor tries to enter through the exit or if a visitor is going to move to some other place, voice information can be reproduced from the reproducing device to urge him or her to enter through the specified entrance.

When a visitor who has used the reproducing device and has come out of the exit is leaving the area where the visitor should return the device, it is possible to continuously reproduce voice information to request a return of the reproducing device or emit a warning alarm to thereby prevent an unlawful walking away with the reproducing device.

DETAILED DESCRIPTION OF THE PREFERRED EMBODIMENTS

Figure 1:
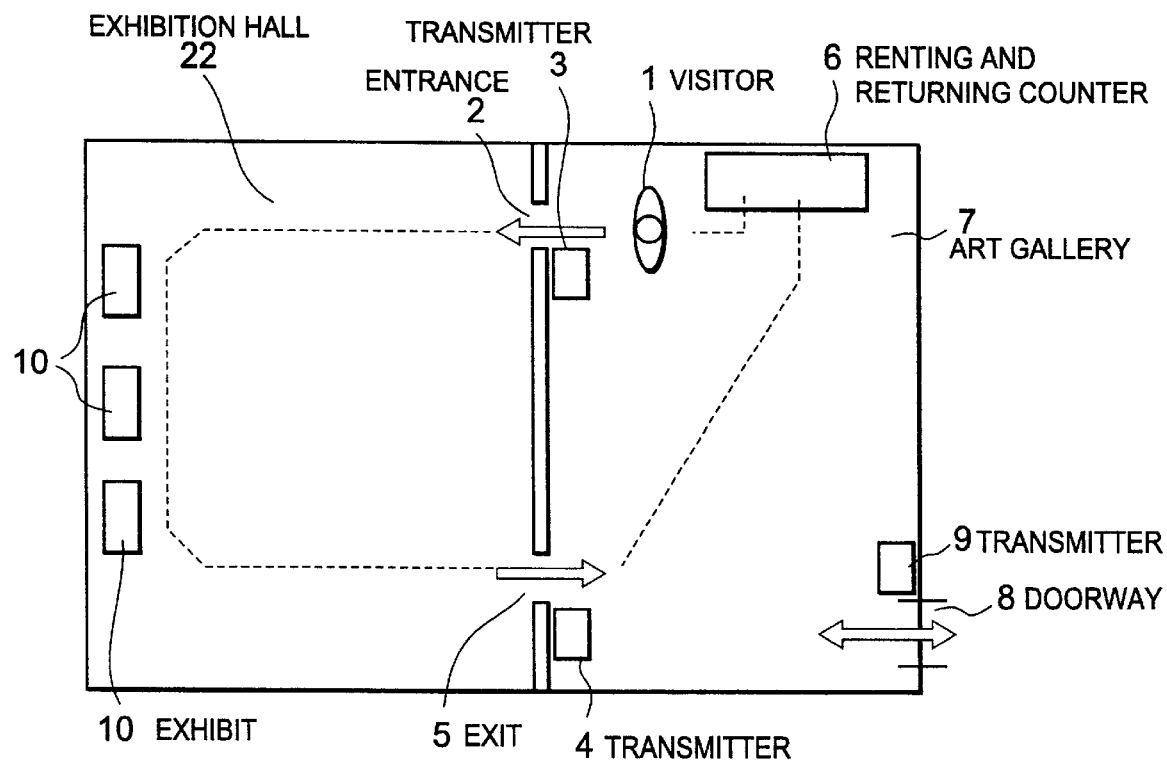
FIG. 1 is a plan view, taken from above, of an art gallery where a reproducing device according to an embodiment of the present invention is used.

A Preferred embodiment of the present invention will be described referring to the drawings.

Figure 2:
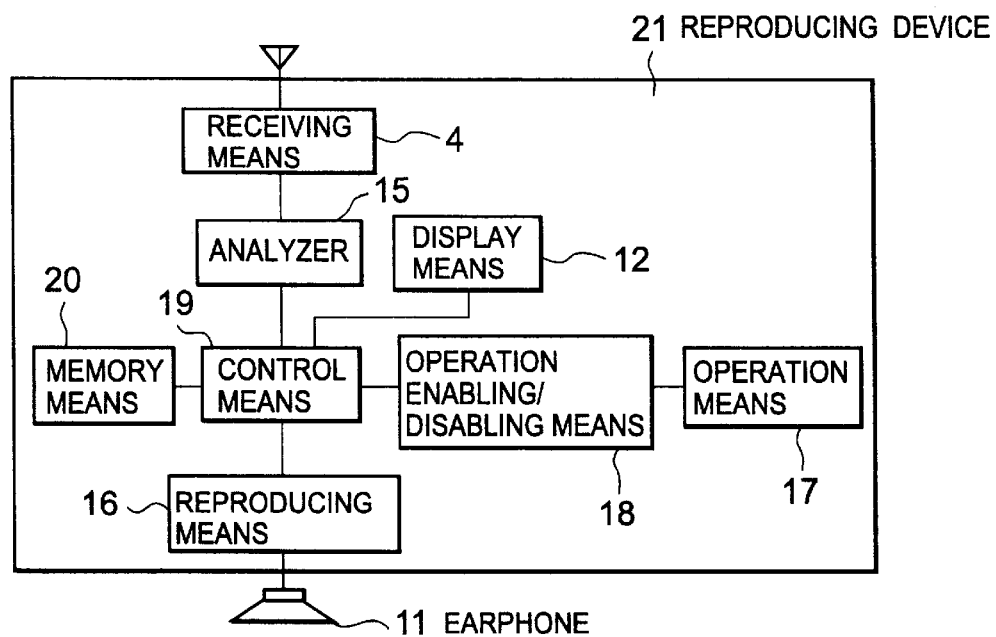
FIG. 2 is a block diagram of the reproducing device according to the embodiment of the present invention.

FIG. 1 is a plan view, taken from above, of an example of an art gallery that uses a reproducing device according to an embodiment of the present invention. FIG. 2 is a block diagram showing a circuit configuration of the reproducing device according to this embodiment of the present invention and FIG. 3 is an external view of the reproducing device according to this embodiment.

In this embodiment, an ID code signal is a signal that a transmitter transmits as an index for reading voice information peculiar to an exhibit or a place from a memory part of the reproducing device.

Figure 3:
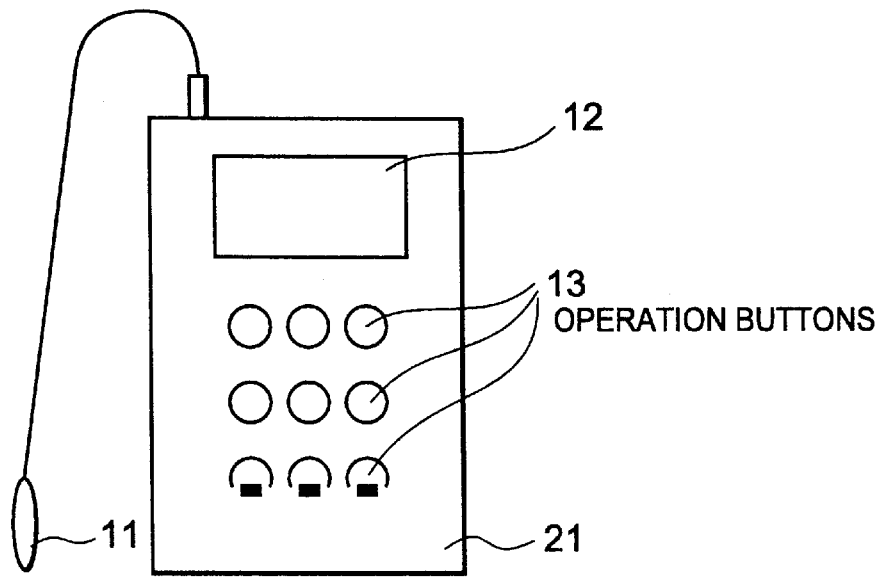
FIG. 3 is an external view of the reproducing device according to the embodiment of the present invention.
Figure 5:
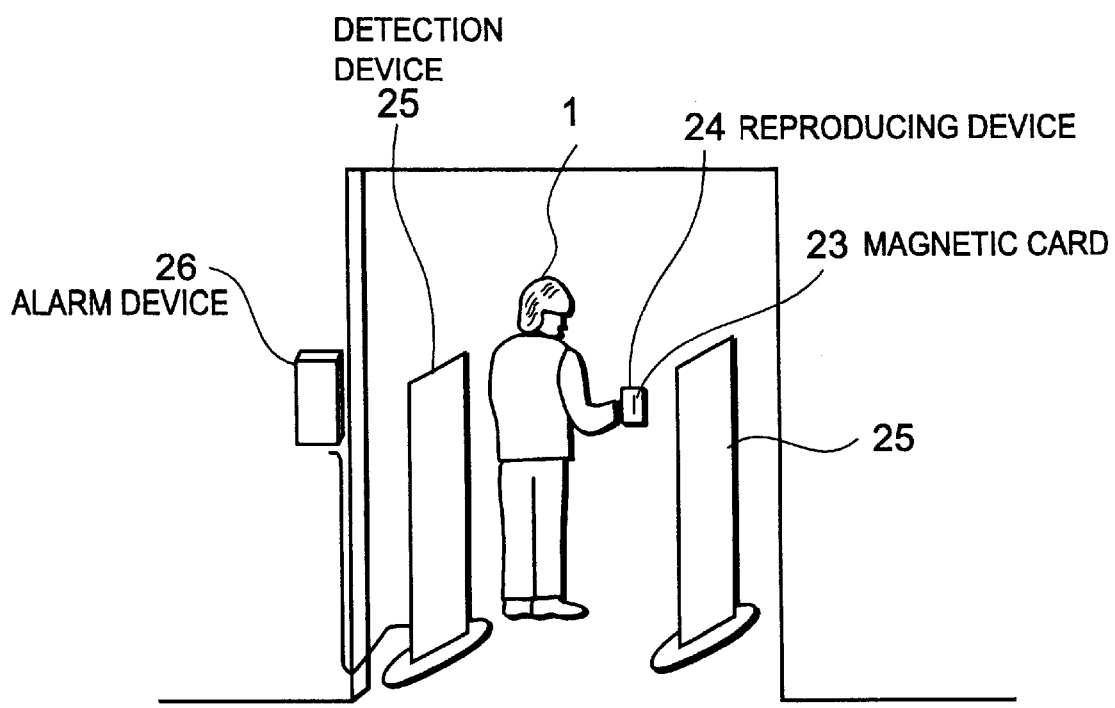
FIG. 5 is a schematic diagram showing an example of a conventional theft-preventive device.

The reproducing device 21 is equipped with operation buttons 13 and a display means 12 in a front surface thereof as shown in the external appearance in FIG. 3.

When a required guide number is input by pressing the operation buttons 13, the display means 12 shows the guide number, and the reproducing means 16 (shown in FIG. 2) starts reproduction, making it possible to hear a guide voice by an earphone 11.

The reproducing device 21, as shown in the block diagram in FIG. 2, receives an ID code signal at its receiving means 14, and analyzes the received ID code signal at its ID analyzer 15.

The operation means 17 gives a command to the control means 19 through the operation enabling/disabling means 18 by manipulating the operation buttons 13.

By an ID code signal analyzed by the ID analyzer 15, the control means 19 controls the operation enabling/disabling means 18 that connects or disconnects between the operation means 17 and the control means 19.

The memory means stores voice information associated with an ID code signal and voice information associated with a guide number entered from the operation means 17.

Further, by an ID code signal analyzed by the ID analyzer 15, the control means 19 causes voice information associated with the ID code signal to be read from the memory means 20, and controls the reproducing means 16 such that it reproduces the voice information to output voice from the earphone 11.

When the control means 19 has put the operation enabling/disabling means 18 in a connected state in response to an ID code signal analyzed by the ID analyzer 15, the control means 19 causes a guide number entered from the operation means 17 to be displayed on the display means 12, and causes voice information associated with the guide number to be read from the memory means 20, and controls the reproducing means 16 such that it reproduces the voice information to output voice from the earphone 11.

Referring to FIG. 1, the layout of the art gallery 7 will be described.

The art gallery has a doorway 8, and in the vicinity of the doorway 8, there is installed a transmitter 9 whose transmission output is receivable only in the vicinity of the doorway 8, and which transmits an ID code signal c.

When one enters the doorway 8, on his right-hand side, there is a renting and returning counter 6 of the reproducing devices 21, and beyond that there is an exhibition hall 22.

The exhibition hall 22 has an entrance 2. Near the entrance 2, a transmitter 3 is installed which transmits an ID code signal a.

The transmitter 3 produces transmission output that allows a signal to be received only in the vicinity of the entrance 2 and is arranged not to suffer radio interference by other transmitters.

The exhibition hall 22 has an exit 5. Near the exit 5, a transmitter 4 is installed which transmits an ID code signal b.

The transmitter 4 produces transmission output that allows a signal to be received only in the vicinity of the exit 5 and is arranged not to suffer radio interference by other transmitters.

Description will be made of the operation of a reproducing device 21 in the above-mentioned art gallery 7.

A visitor 1 goes into the doorway 8 of the art gallery 7 and borrows a reproducing device 21 at the renting and returning counter 6. When the visitor 1 comes close to the entrance 2 of the exhibition hall 22, the receiver 14 of the reproducing device 21 receives an ID code signal a transmitted from the transmitter 3.

The ID analyzer 15 of the reproducing device 21 analyzes an ID code signal a and the control means 19 outputs a control signal to the operation enabling/disabling means 18 to connect between the operation means 17 and the control means 19, thus making the control means 19 controllable by a command from the operation means 17 and making it possible to hear voice information.

The visitor 1 who has entered the exhibition hall 22, looking at a guide number indicated at an exhibit 10, manipulates the operation buttons 13 on the reproducing device 21 to input the guide number to hear the description of the exhibit 10 on display.

When the guide number is input, the control means 19 causes voice information associated with the input guide number to be output from the memory means to the reproducing means 16 and controls the reproducing means 16 such that it reproduces voice information from the earphone 11.

Thus, it becomes possible to hear voice information related to the exhibit 10 on display in the exhibition hall 22 from the reproducing device 21.

When the visitor carrying the reproducing device 21 comes out of the exit 5 of the exhibition hall 22, the receiving means 14 of the reproducing device 21 receives the ID code signal b transmitted from the transmitter 4 installed close thereto.

The ID analyzer 15 analyzes the received ID code signal b, and the control means 19 outputs a control signal to the operation enabling/disabling means 18 to disconnect between the control means 19 and the operation means 17, thus making the control means 19 uncontrollable by a command from the operation means 17.

Voice information requesting the visitor 1 to return the reproducing device 21 to the renting and returning counter 6 is transmitted from the memory means to the reproducing means 16 and output from the earphone 11. The visitor 1 returns the reproducing device 21 to the renting and returning counter 6.

However, it may be presumed that some of visitors 1, while carrying the reproducing device 21 which they borrowed from the renting and returning counter 6, do not enter through the specified entrance 2. For example, if a visitor 1 is going to enter through the exit 5, the receiving means 14 of the reproducing device 21 firstly receives an ID code signal b from the transmitter 4 near the exit 5, for disabling a command from the operation means 17 of the reproducing device 21. In this case, the control means 19, regardless of the use condition of the reproducing device 21, causes voice information for leading the visitor to the specified entrance 2 to be output from the memory means and controls the reproducing means 16 such that it reproduces the voice information to output it from the earphone 11. Thus, the visitor 1 is led to the specified entrance 2.

Another presumable case is that a visitor 1 carrying a reproducing device 21 does not enter through the entrance 2, crosses a transmission range of an ID code signal a transmitted from the transmitter 3 installed near the entrance 2, and while he has not manipulated the operation means 17, the receiving means 14 of the reproducing device 21 receives an ID code signal b transmitted from the transmitter 4 in the vicinity of the exit 5.

In this case, the reproducing device 21 receives an ID code signal a and then an ID code signal b, and therefore regardless of the use condition of the reproducing device 21, the control means 19 causes voice information for leading the visitor 1 to the specified entrance 2 to be output from the memory means and controls the reproducing means 16 such that it reproduces the voice information to output it from the earphone 11, thus leading the visitor 1 to enter through the specified entrance 2.

An additional presumable case is that a visitor 1 who borrowed a reproducing device 21 goes toward the doorway 8 of the art gallery 7 without passing through the transmission ranges of the transmitters 3 and 4 near the entrance 2 and the exit 5.

In this case, the reproducing device 21 receives an ID code signal c in the first place, and therefore the control means 19, regardless of the use condition of the reproducing device 21, causes voice information for leading the visitor 1 to the specified entrance 2 to be read from memory means and controls the reproducing means 16 such that it reproduces the voice information to output it from the earphone 11, thus leading the visitor 1 to go to the specified entrance 2.

A further presumable case is that a visitor 1 looks around following an ordinary route, and after coming out of the exit 5 of the exhibition hall 22, the visitor 1 does not return the reproducing device 21 to the renting and returning counter 6 and goes out through the doorway 8 of the art gallery 7 carrying the reproducing device 21.

In the reproducing device 21, when it first receives an ID code signal a, it becomes possible to send a command from the operation means 17 to the control means 19. Therefore, voice information about an exhibit 10 is reproduced by manipulating the operation means 17, and then an ID code signal b is received, so that the operation by the operation means 17 is prohibited, and after voice information requesting a return of the reproducing device 21 is reproduced, an ID code signal c is received.

If an ID code signal c is received after a sequence of steps as mentioned above, the control means 19 controls the memory means and the reproducing means 16 so that voice information requesting a return of the reproducing device 21 is reproduced repeatedly. In this manner, it is possible to prevent the reproducing device 21 from being taken out by the visitor 1.

Instead of repeated reproduction of voice information requesting a return of the reproducing device 21, an alarm means (not shown) may be mounted on the reproducing device 21 to emit a warning alarm to prevent the reproducing device 21 from being taken out.

To stop reproduction of voice information requesting a return of the reproducing device or to stop a warning alarm, the operation buttons 13 on the operation means 17 are operated in a special manner or a reset switch or a power supply switch intangible to the visitor 1 is operated.

Figure 4:
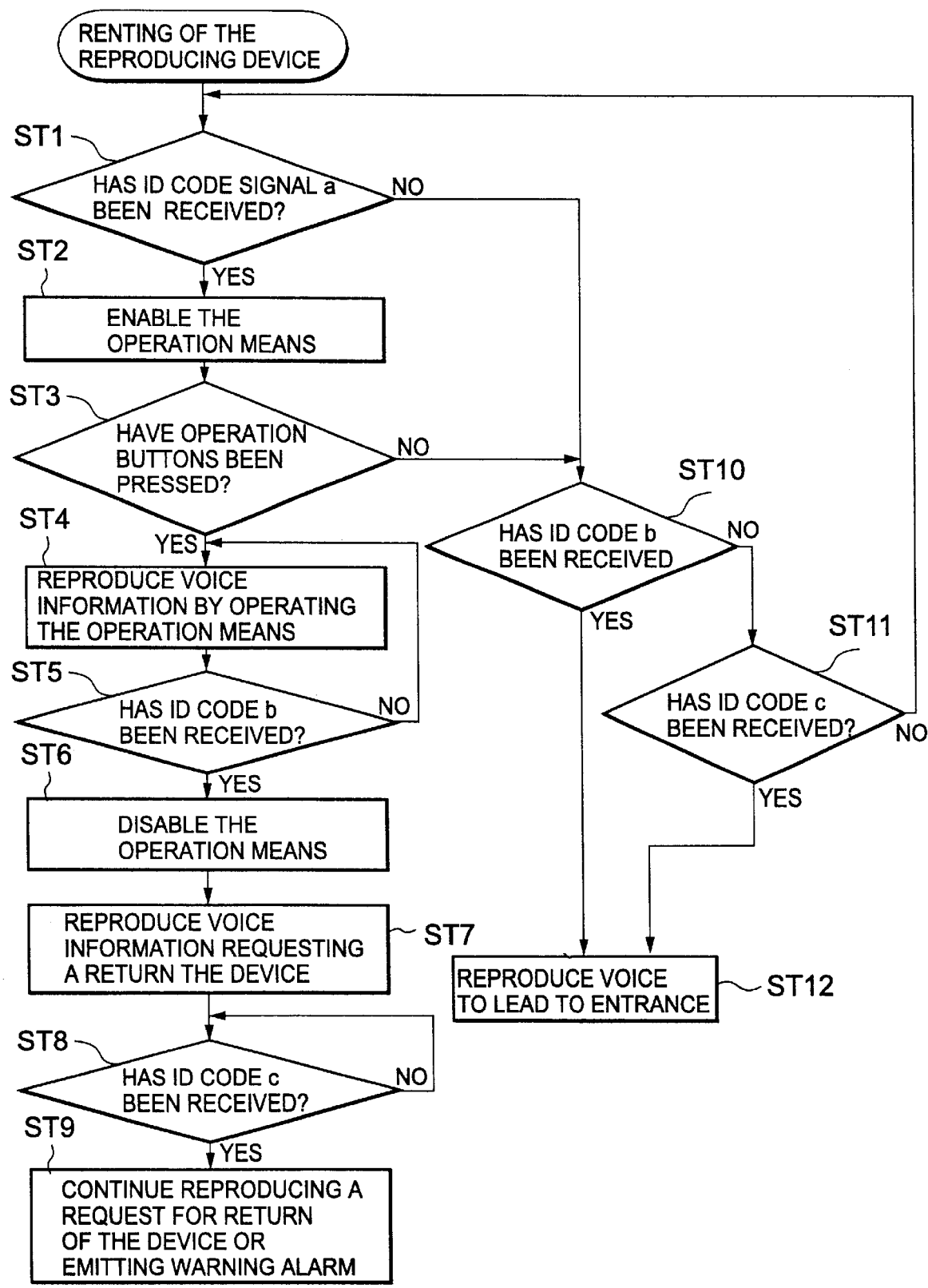
FIG. 4 is a flowchart of the operation of the reproducing device according to the embodiment of the present invention when the receiving part receives ID code signals.

FIG. 4 is a flowchart of the operation of the reproducing device 21 according to this embodiment when an ID code signal is received.

In FIG. 4, the control means 19 decides whether or not the receiving means 14 of the reproducing device 21 has received an ID code signal a from the transmitter 3 (ST1).

When the receiving means 14 receives an ID code signal a and the ID analyzer 15 analyzes the received signal and clarifies that the signal is an ID code signal a (YES), the control means 19 puts the operation enabling/disabling means 18 in a connected state, thus enabling the operation means 17 to input a command (ST2).

The control means 19 decides whether or not a command has been input from the operation means 17 (ST3).

When a command has been input from the operation means 17, the control means 19, responding to the command, causes the reproducing means 16 to read voice information from the memory means and causes voice information to be output from the earphone 11 (ST4).

The control means 19 decides whether or not the receiving means 14 has received an ID code signal b from the transmitter 4 (ST5).

When the receiving means 14 has received the ID code signal b and the ID analyzer 15 analyzes the received signal and clarifies that the signal is an ID code signal b (YES), the control means 19 puts the operation enabling/disabling means 18 in a disconnected state, thus disabling the operation means 17 for inputting a command (ST6).

The control means 19 causes the reproducing means 16 to read voice information requesting a return of the reproducing device 21 from the memory means and causes voice information to be output from the earphone 11 (ST7).

The control means 19 decides whether or not the receiving means 14 of the reproducing device 21 has received an ID code signal c from the transmitter 9 (ST8).

When the receiving means 14 has received the ID code signal c and the ID analyzer 15 analyzes the received signal and clarifies that the signal is an ID code signal c (YES), the control means 19 causes the reproducing means 16 to continue reading voice information requesting the visitor to return the reproducing device 21 from the memory means and causes voice information to be output from the earphone 11. Or, an alarm means is caused to produce a warning alarm (ST9).

When the receiving means 14 of the reproducing device 21 has not received an ID code signal a from the transmitter 3 at ST1, the control means 19 decides whether or not an ID code signal b from the transmitter 4 has been received (ST10).

If an ID code signal b from the transmitter 4 has not been received (NO) at ST10, the control means 19 decides whether or not the receiving means 14 of the reproducing device 21 has received an ID code signal c from the transmitter 9 (ST11).

When an ID code signal b from the transmitter 4 has been received (YES) at ST10 or when an ID code signal c from the transmitter 5 has been received (YES) at ST11, the control means 19 transfers voice information for leading the visitor to the specified entrance from the memory means to the reproducing means 16 and causes voice information to be output from the earphone 11 (ST12).

If the ID code signal c from the transmitter 5 has not been received (NO) at ST11, the process goes back to ST1.

According to the present invention, it becomes unnecessary to mount a theft-preventive means on the reproducing device or install a detecting device at the exit of the hall.

Because the reproducing device is inoperable outside the hall, the reproducing device can be prevented from being stolen.

If a visitor attempts to enter through the exit or if the visitor is going to move to another place, the reproducing device borrowed by the visitor reproduces voice information that warns the visitor against entering through the exist and gives advice to enter through the specified entrance.

If a visitor who has used the reproducing device and has come out of the exit and is going out of the other doorway without returning the reproducing device, the reproducing device can prevent the visitor from walking away with it by continuously reproducing voice information urging the visitor to return the reproducing device.

What is claimed is:

1. A reproducing device comprising:

a receiving means for receiving ID code signals, said ID code signals being instructions transmissions;

an ID analyzing means for analyzing the received ID code signals;

a memory means for storing voice information;

a reproducing means for reproducing voice information stored in said memory means;

a control means for controlling said receiving means, ID analyzing means, memory means and reproducing means; and an operation means for accepting an instruction from a user, wherein either when said receiving means receives one of said ID code signals analyzed by said ID analyzing means as an instruction to prohibit the user from operating said reproducing device before said receiving means receives one of said ID code signals analyzed by said ID analyzing means as an instruction to allow the user to operate said reproducing device, on when said receiving means receives one of said ID code signals analyzed by said ID analyzing means as an instruction to prohibit the user from operating said reproducing device without said operation means accepting an instruction from the user after said receiving means receives one of said ID code signals analyzed by said ID analyzing means as an instruction to allow the user to operate said reproducing device, said control means controls said reproducing means so as to read voice information from said memory means for leading the user to a specified entrance and reproduce the read voice information.

2. A reproducing device comprising:
a receiving means for receiving ID code signals, said ID code signals being instructions transmissions;
an ID analyzing means for analyzing the received ID code signals;
a memory means for storing voice information;
a reproducing means for reproducing voice information stored in said memory means;
a control means for controlling said receiving means, ID analyzing means, memory means and reproducing means; and
an operation means for accepting an instruction from a user, wherein
when said receiving means first receives one of said ID code signals analyzed by said ID analyzing means as an instruction to prevent a theft of said reproducing device without receiving either of one of said ID code signals analyzed by said ID analyzing means as an instruction to permit the user to operate said reproducing device and one of said ID code signals analyzed by said ID analyzing means as an instruction to prohibit the user from operating said reproducing device, said control means controls said reproducing means so as to read voice information from said memory means for leading the user to a specified entrance and reproduce the read voice information.

3. A reproducing device comprising:
a receiving means for receiving ID code signals, said ID code signals being instructions transmissions;
an ID analyzing means for analyzing the received ID code signals;
a memory means for storing voice information;
a reproducing means for reproducing voice information stored in said memory means;
a control means for controlling said receiving means, ID analyzing means, memory means and reproducing means;
an operation means for accepting an instruction from a user; and
an operation enabling/disabling means for connecting or disconnecting for said operation with said control means, wherein when said receiving means receives one of said ID code signals analyzed by said ID analyzing means as an instruction to allow the user to operate said reproducing device, said operation enabling/disabling means connects said operation means with said control means so as to enable said control means to execute a controlling function necessary for a reproducing operation according to an instruction accepted by said operation means, and when said receiving means receives one of said ID code signals analyzed by said ID analyzing means as an instruction to prohibit the user from operating said reproducing device after it receives one of said ID code signals analyzed by said ID analyzing means as an instruction to allow the user to operate said reproducing device, said operation enabling/disabling means disconnects said operation means from said control means so as to disable said control means to execute a controlling function necessary for a reproducing operation according to an instruction accepted by said operation means, and said control means controls said reproducing means so as to read voice information from said memory means for requesting the user the return said reproducing device to a returning location and reproduce the read voice information.

4. A reproducing device comprising:
a receiving means for receiving ID code signals, said ID code signals being instructions transmissions;
an ID analyzing means for analyzing the received ID code signals;
a memory means for storing voice information;
a reproducing means for reproducing voice information stored in said memory means;
a control means for controlling said receiving means, ID analyzing means, memory means and reproducing means;
an operation means for accepting an instruction from a user; and
an operation enabling/disabling means for connecting to or disconnecting said operation means with said control means, wherein
when said receiving means receives one of said ID code signals analyzed by said ID analyzing means as an instruction to allow the user to operate said reproducing device, said operation enabling/disabling means connects said operation means with said control means so as to enable said control to execute a controlling function necessary for a reproducing operation according to an instruction accepted by said operation means,
when said receiving means receives one of said ID code signals analyzed by said ID analyzing means as an instruction to prohibit the user from operating said reproducing device after it receives one of said ID code signals analyzed by said ID analyzing means as an instruction to allow the user to operate said reproducing device, said operation enabling/disabling means disconnects said operation means from said control means so as to disable said control means to execute a controlling function necessary for a reproducing operation according to an instruction accepted by said operation means, and
when said receiving means receives one of said ID code signals analyzed by said ID analyzing means as an instruction to prevent a theft of said reproducing device after it receives one of said ID code signals analyzed by said ID analyzing means as an instruction to allow the user to operate said reproducing device and one of said ID code signals analyzed by said ID analyzing means as an instruction to prohibit the user from operating said reproducing device, said control means controls said reproducing means so as to read voice information from said memory means for requesting the user to return said reproducing device to a returning location of said reproducing device and reproduce the read voice information.

5. A reproducing device comprising:
a receiving means for receiving ID code signals, said ID code signals being instructions transmissions;
an ID analyzing means for analyzing the received ID code signals;
a memory means for storing voice information;
a reproducing means for reproducing voice information stored in said memory means;

a control means for controlling said receiving means, ID analyzing means, memory means and reproducing means;

an operation means for accepting an instruction from a user;

an operation enabling/disabling means for connecting or disconnecting said operation means with said control means; and an alarm means, wherein when said receiving means receives one of said ID code signals analyzed by said ID analyzing means as an instruction to allow the user to operate said reproducing device, said operation enabling/disabling means connects said operation means with said control means so as to enable said control means to execute a controlling function necessary for a reproducing operation according to an instruction accepted by said operation means, when said receiving means receives one of said ID code signals analyzed by said ID analyzing means as an instruction to prohibit the user from operating said reproducing device after it receives one of said ID code signals analyzed by said ID analyzing means as an instruction to allow the user to operate said reproducing device, said operation enabling/disabling means disconnects said operation means from said control means so as to disable control means to execute a controlling function necessary for a reproducing operation according to an instruction accepted by said operation means, and when said receiving means receives one of said ID code signals analyzed by said ID code analyzing means as an instruction to prevent a theft of said reproducing device after it receives one of said ID code signals analyzed by said ID analyzing means as an instruction to allow the user to operate said reproducing device and one of said ID code signals analyzed by said ID analyzing means as an instruction to prohibit the user from operation of said reproducing device, said control means controls said alarm means so as to emit a warning alarm.

* * * * *